Figure 1:
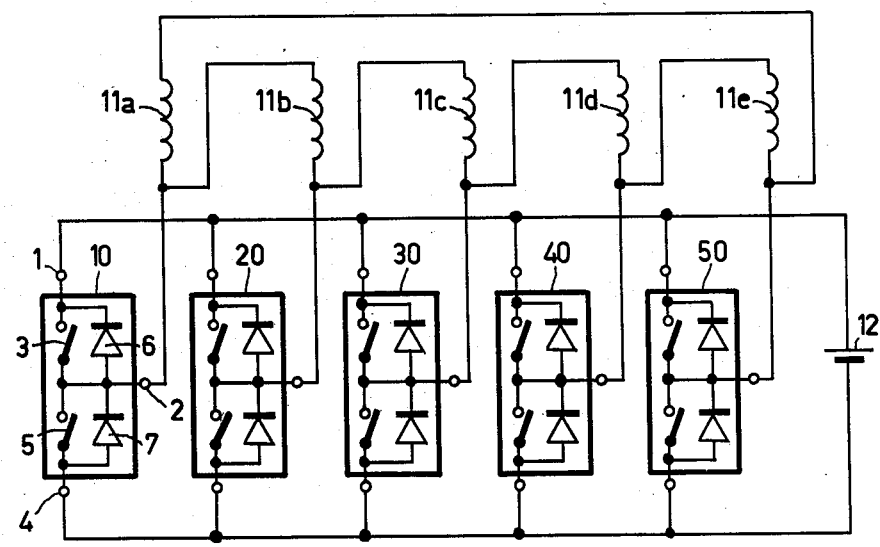

United States Patent

Radziwill et al.

[11] Patent Number: 4,628,231
[45] Date of Patent: Dec. 9, 1986

[54] DC MOTOR WITH ELECTRONIC COMMUTATION CIRCUIT

[75] Inventors: Wolfgang Radziwill, Aachen; Günter Döring, Würselen, both of Fed. Rep. of Germany; Hans Steinbusch, Schaesberg, Netherlands

[73] Assignee: U.S. Philips Corporation, New York, N.Y.

[21] Appl. No.: 191,104

[22] Filed: Sep. 26, 1980

[30] Foreign Application Priority Data

Oct. 6, 1979 [DE] Fed. Rep. of Germany ....... 2940637

[51] Int. Cl.[4] ............................................. H02K 29/00
[52] U.S. Cl. ..................................... 318/138; 318/254
[58] Field of Search ................................ 318/138, 254

[56] References Cited

U.S. PATENT DOCUMENTS

| | | | |
|---|---|---|---|
| 3,402,333 | 9/1968 | Hayner et al. | 318/138 |
| 4,004,202 | 1/1977 | Davis | 318/138 |
| 4,278,926 | 7/1981 | Bartlett | 318/138 |

*Primary Examiner*—William M. Shoop, Jr.
*Assistant Examiner*—Saul M. Bergmann
*Attorney, Agent, or Firm*—Robert T. Mayer; Bernard Franzblau

[57] ABSTRACT

A DC motor is commutated by magnetically controllable electronic switches in the form of integrated semiconductor circuits. Each switch comprises a first switching path between a first input terminal and an output terminal and a second switching path between a second input terminal and the output terminal. The two switching paths are controlled by the magnetic field of the rotor such that either the one or the other switching path is closed and that both switching paths are open in positions intermediate between these two positions.

11 Claims, 12 Drawing Figures

DC MOTOR WITH ELECTRONIC COMMUTATION CIRCUIT

The invention relates to a DC motor with a permanent magnet rotor and an electronic commutation circuit which is controlled by the magnetic field of the rotor.

Such DC motors are known (see for example Philips Technische Rundschau 31, (1970) 11/12, 383).

In these motors the instantaneous rotor position is detected via Hall elements and this information is employed for controlling the commutation circuit which consists of discrete components.

However, the commutation circuit of such a DC motor is comparatively intricate because many components are required. Furthermore, the construction of the motor is intricate because, for example, the Hall elements are arranged inside the stator winding and can no longer be replaced or aligned after winding. Moreover, the commutation circuits used do not provide real commutation in the sense of a reversal of the current direction in each stator coil, but they merely produce a periodic turn-on and turn-off.

It is an object of the invention to construct a DC motor of the type mentioned in the opening paragraph in such a way that said motor and the commutation circuit which is used are substantially simplified and that the motor windings are used effectively.

According to the invention this object is achieved in that the armature winding accommodated in the stator comprises m phase windings connected in m-cornered mesh or in star, that one end of each phase winding is connected to the output terminal of a magnetically controllable switch in the form of an integrated semiconductor circuit, that the power-supply source is connected between a first and a second input terminal of each switch, that there is arranged a first switching path between the first input terminal and the output terminal of each switch and a second switching path between the second input terminal and the output terminal, that the first and the second switching paths are controllable in such a way that, when a switch is exposed to a magnetic field B, its first switching path is closed if $B > B_0 + [(\Delta B)/2]$, its second switching path is closed if $B < B_0 - [(\Delta B)/2]$, and that its two switching paths are open if $|B - B_0| < [(\Delta B)/2] \times \epsilon$, where $0 < \epsilon < 1$ and $\Delta B \geq 0$, and that the individual switches are symmetrically arranged on the stator of the motor in such a way that they are controlled by the magnetic field of the rotor in a cyclic sequence.

Further embodiments of the invention will be apparent from the description to follow and the claims.

The advantages obtained by means of the invention are in particular that, apart from a magnetically controllable switch of the said type per phase, no further electronic components are required, that the motor comprises only a few simple parts which are suitable for largely automated production, which are very simple to mount, that the armature windings are effectively used because, owing to the use of the switches, currents in both directions can be obtained, and that the arrangement of the switches ensures a high degreee of decoupling between the Hall elements in the switches and the armature field so that the switches can be controlled by the magnetic field of the rotor.

Figure 2A:
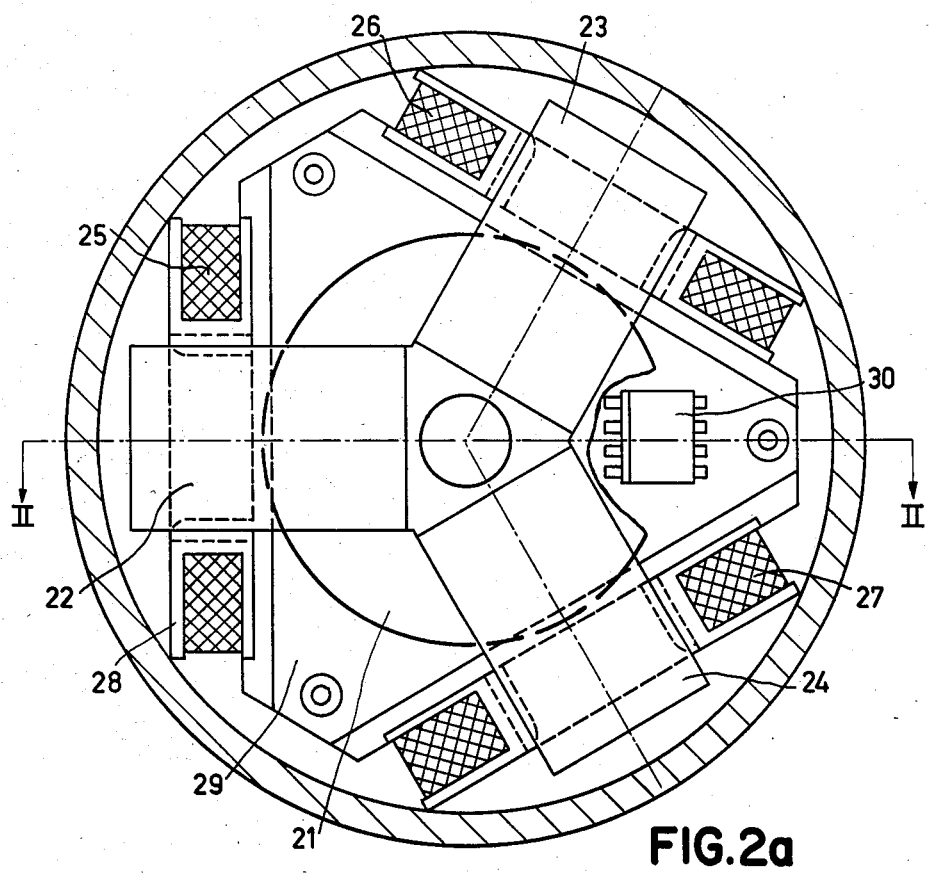
Figure 2B:
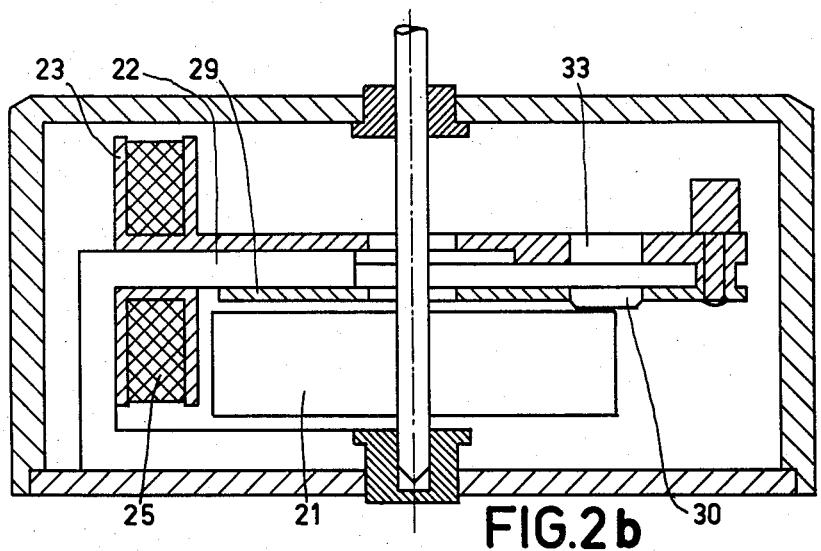
Figure 3:
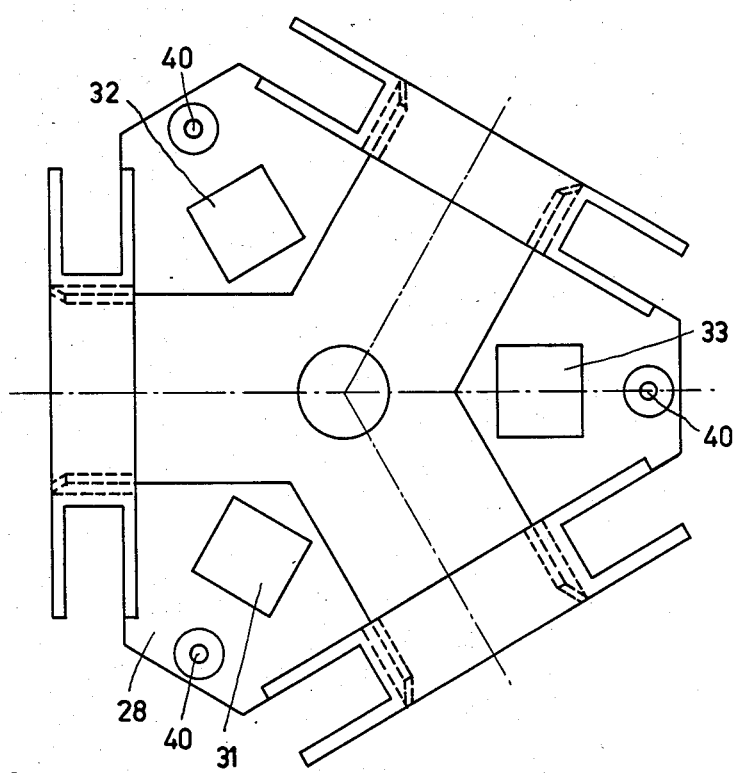
Figure 5:
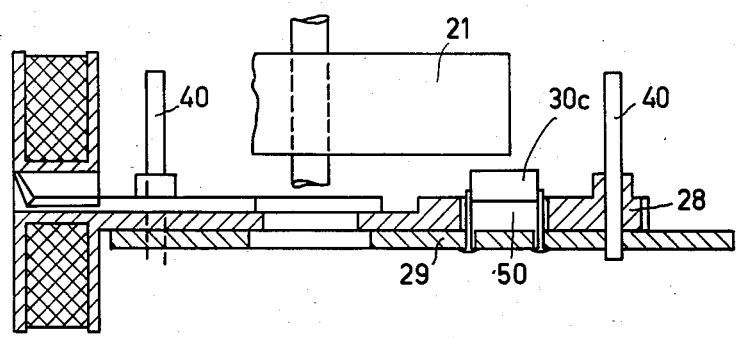
Figure 6A:
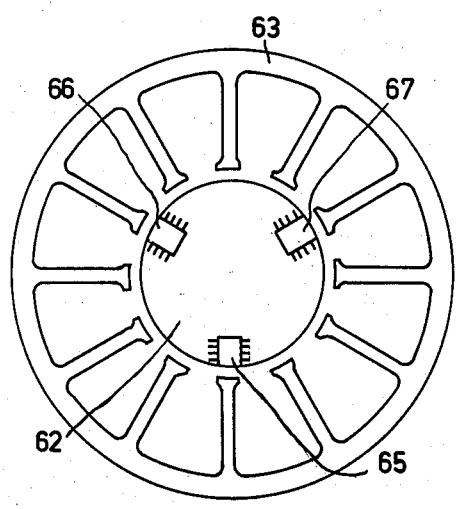
Figure 6B:
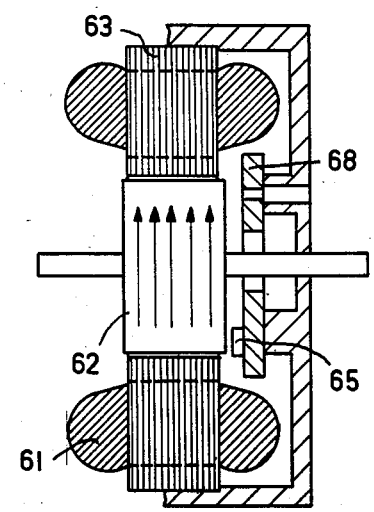
Figure 7:
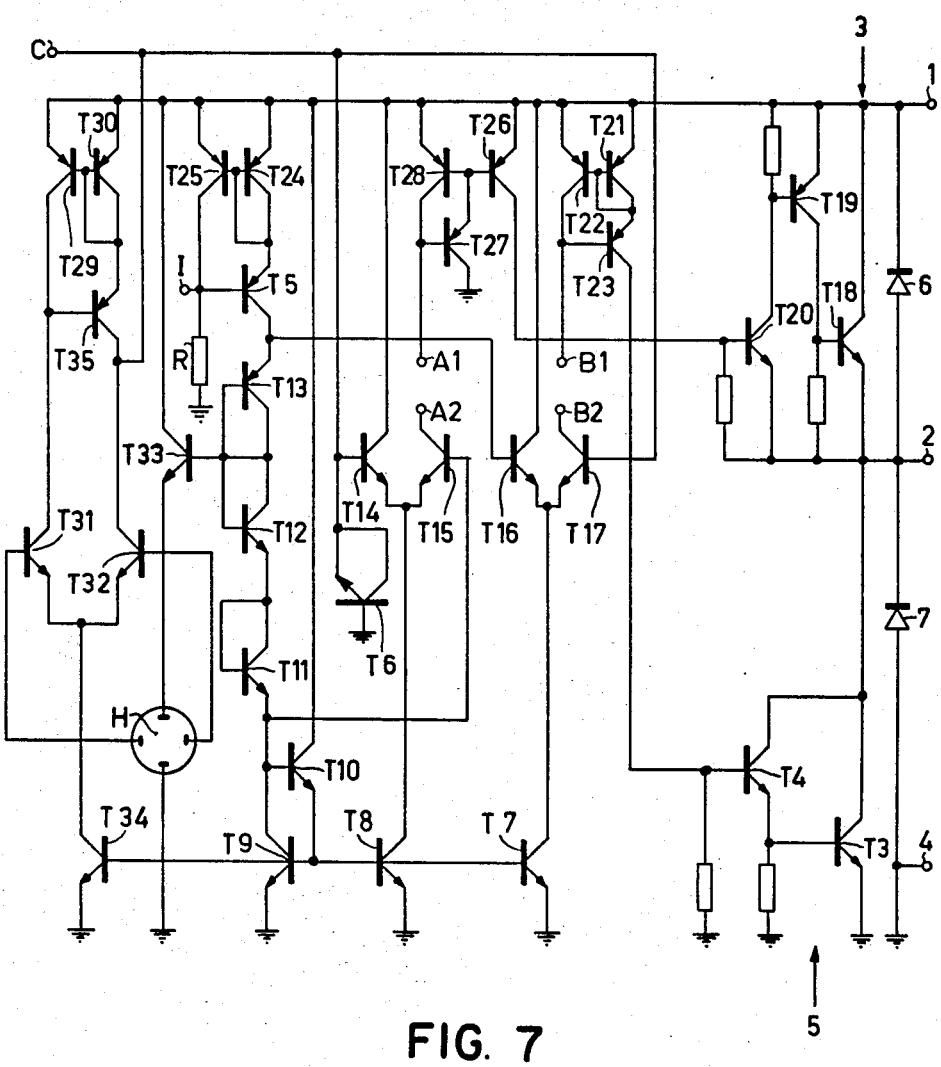
Figure 8:
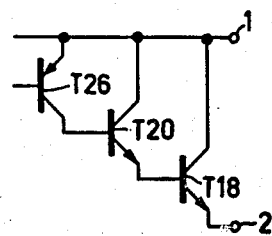
Figure 9:
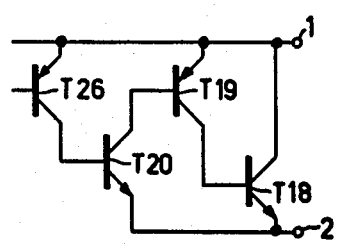

The invention will be described in more detail with reference to the accompanying drawings. In the drawings:

FIG. 1 represents the circuit diagram of a DC motor with a five-pole stator winding and a commutation circuit comprising five magnetically controlled switches, FIGS. $2a+b$ schematically represent two views of a DC motor with three stator windings and three magnetically controlled switches, FIG. 3 shows a coil former for the stator windings of the motor of FIG. 2, which also carries the magnetically controlled switches, FIGS. $4a+b$ represent two versions of a p.c. board accommodating three magnetically controlled switches, which may be combined with a coil former in accordance with FIG. 3, FIG. 5 represents a variant of the connection between a coil former and a p.c. board for a motor in accordance with FIG. 2, FIG. 6 schematically represents two views of a further embodiment of a DC motor, FIG. 7 is a circuit diagram of a switch in the form of a monolithic integrated circuit, and FIGS. 8 and 9 represent circuit details for illustrating the operation of the circuit of FIG. 7.

FIG. 1 shows the circuit diagram of a DC motor having five armature windings 11a to 11e accommodated in the stator, which windings are connected to form a pentagon. These windings are energized by a five-phase bridge circuit, which is constituted by five switches 10, 20, 30, 40 and 50 which can be controlled by the magnetic field of the permanent-magnet rotor.

The individual switches are symmetrically arranged on the stator in such a way that they are disposed near enough to the permanent-magnet rotor to be controlled in a cyclic sequence by the magnetic field of said rotor. Each of said switches is connected to a power supply source 12 between a first input terminal 1 and a second input terminal 4, and each switch comprises a first switching path 3 between the first input terminal 1 and an output terminal 2 and a second switching path 5 between the second input terminal 4 and the output terminal 2. The first and the second switching paths are controllable in such a way that when a switch is exposed to a magnetic field B by the rotor, its first switching path 3 is closed if $B > B_0 + [(\Delta B)/2]$, its second switching path 5 is closed if $B < B_0 - [(\Delta B)/2]$, and its two switching paths are open if $|B - B_0| < [(\Delta B)/2] \times \epsilon$, where $0 < \epsilon < 1$ and $\Delta B \geq 0$. Here $B_0$ is a value which is determined by the offset of the Hall elements in the switches and which for a practical switch is <25 mT. $\epsilon$ is a value which follows from the tolerances of the circuit elements in the switches and for practical switches is between 0.5 and 1. The term $\Delta B$ is the threshold level with respect to the zero signal field $B_0$ at which the Hall element switch conducts.

Magnetically controlled switches of this type form the subject of Applicant's copending U.S. patent application Ser. No. 191,103 filed Sept. 26, 1980 and will be described in more detail below. Suitably, a flywheel diode 6 or 7 is connected in parallel with each switching path in each switch.

In the circuit arrangement shown in FIG. 1 the individual stator windings are arranged to form a closed polygon mesh, i.e. a pentagon. However, other arrangements of the phase windings are possible, for example the individual windings may alternatively be connected in star.

FIGS. 2a+b in (schematic) sectional view and plan view represent a DC motor having three stator windings, which may be connected in delta or in star, and three magnetically controlled switches, which constitute the commutation circuit for said motor.

In addition to the housing the motor shown essentially comprises a permanent-magnet rotor 21 and three U-shaped lamination assemblies 22, 23 and 24, which are arranged in coil formers which carry the three stator windings 25, 26 and 27. The three coil formers together constitute a unit 28, i.e. they are constituted by a single plastics injection-moulded part 28. Connected to this common coil former 28 is a printed circuit board 29 having recesses which accommodate three magnetically controlled switches 30, which drive the stator windings 25 to 27, and take the form of integrated circuits which are symmetrically arranged along the circumference. FIG. 2 shows only one of these switches. As already stated, the arrangement of the switches is symmetrical in such a way that the stator windings are driven in a cyclic sequence by the magnetic field of the rotor 21.

Figure 4A:
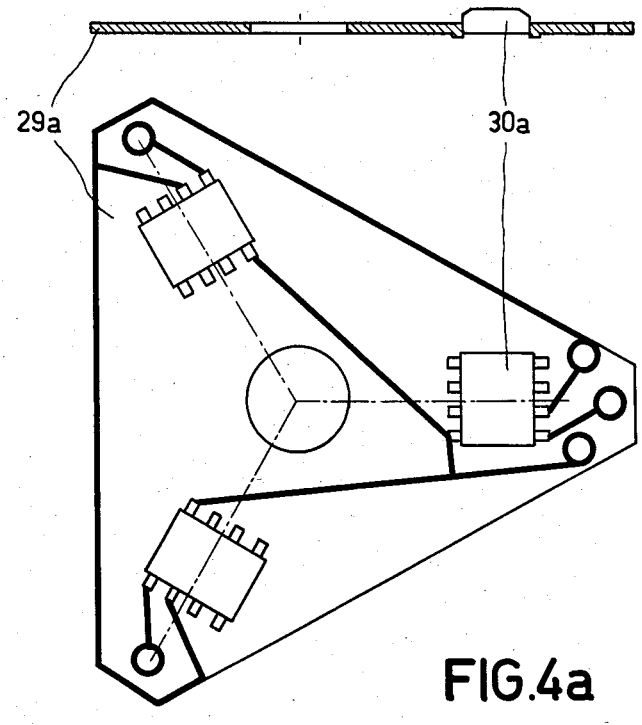

FIG. 3 shows the common coil former 28 separately in plan view and, in addition to the individual coil formers, shows three recesses 31, 32 and 33 whose locations correspond to the locations of the switches on the p.c. board which is mounted on said common coil former. Alternatively, it is possible to employ the common coil former 28 itself as the p.c. board, i.e. to provide it with conductive tracks and to mount the switches directly on said former in said recesses 31 to 33. However, it is more effective to mount the switches, which are constituted by integrated circuits, on a special p.c. board 29, of which two examples are shown in FIGS. 4a+4b. The p.c. board 29a shown in FIG. 4a is particularly suitable for switches in the form of plastics encapsulated integrated circuits 30a. These integrated circuits are fitted in recesses of the p.c. board that correspond to recesses 31–33 in the common coil former 28 of FIG. 3 and in such a way that the thickness of the combination of the p.c. board and the integrated circuits constituting the switches is minimal. This enables the switches to be mounted in the air gap between the rotor and stator.

Figure 4B:
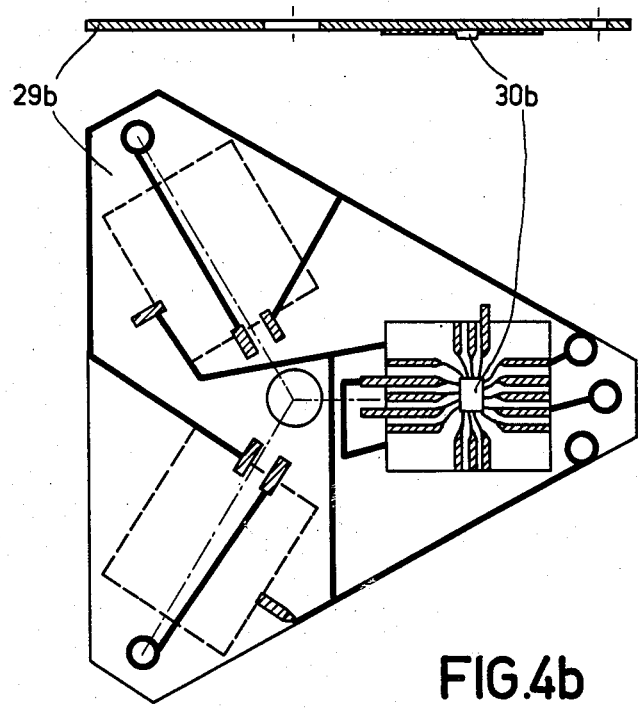

FIG. 4b shows an example of a p.c. board which enables said thickness to be further reduced. This is achieved in that the switches are constituted by circuits 29b which are integrated onto a contact film so that an extremely small thickness is obtained.

Preferably, the common coil former shown in FIG. 3 is provided with three metal pins 40 onto which the p.c. boards, which are formed with corresponding openings, can readily be plugged.

If the air gap of the motor should be so small that it cannot accommodate the p.c. board 29, the integrated circuits 30c constituting the switches, as is shown for one switch in FIG. 5, may be accommodated in one housing with perpendicular connections that may be soldered at suitable distances onto a p.c. board mounted outside the air gap. This is done in such a way that they project so far into the recess 50 of the common coil former 28 that they can be energized by the magnetic field of the rotor 21.

FIG. 6 finally shows a DC motor with a magnetic circuit of conventional design. In contradistinction to the motor shown in FIG. 2, which has a fourpole axially magnetized rotor, the rotor 62 is now of the two-pole diametrically magnetized type. In this case the switches 65 to 67, especially if they take the form of a flat integrated circuit with contact foil, may be arranged between the rotor and stator lamination assemblies. However, this has the drawback that they are then also highly exposed to the fields of the stator coils 61. Therefore, it is more effective, as is shown in the Figure, to utilize the axial stray fields at the ends of the rotor 62 and to arrange a p.c. board 68 carrying the switches 65 to 67 so that they face the axial rotor-end surface.

FIG. 7 represents the circuit diagram of a switch in the form of a monolithic integrated circuit. At the right there are disposed the three connection terminals 1, 2 and 4, the free-wheel diodes 6 and 7, as well as transistors T3 and T18 which serve as switching paths. The free-wheel diode 7 is constituted by the parasitic substrate diode of the transistor T3, while the free-wheel diode 6 is constituted by a transistor with short-circuited base-emitter junction. The transistor T3, constituting the switching path 5, together with the transistor T4 constitutes a Darlington pair which is driven by a current mirror T21, T22, T23.

The transistor T18, which constitutes the switching path 3, however, is driven by the transistors T19 and T20, which in turn are driven by the current mirror T26, T27, T28.

The transistor T18 is driven in a special manner. If in this case a Darlington pair were used, like in the lower stage (T3, T4), the circuit arrangement of FIG. 8 would be obtained with the inclusion of the current-mirror transistor T26. Across transistor T18 this would result in a voltage drop of $U_{CE18} = U_{CE36} + U_{BE20} + U_{BE18}$, which is approximately $U_{BE} \approx 0.7$ V higher than the voltage drop across T3 for which $U_{CE3} = U_{CE4} + U_{BE3}$. This drawback cannot be eliminated solely by means of a complementary Darlington stage, as is shown in FIG. 9 (transistors $T_{18}$ and $T_{19}$), because in bipolar integrated circuits PNP transistors can only be realized with current gain factors which are one to two orders of magnitude smaller than those of NPN transistors. If a second complementary Darlington stage were formed, by connecting the emitter of T20 in the circuit of FIG. 9 to the base of T18 instead of the emitter, this would result in an excessive voltage drop across T18. However, the circuit of FIG. 9, which in FIG. 7 only comprises the additional leakage resistances, ensures that said voltage drop is smaller and that all the currents in the combined circuit T18, T19, T20 only contribute to the load current and contain no dissipative components.

Thus, by means of the output stages of the switch in the circuit of FIG. 7, which begin at the current mirror circuits, an optimum efficiency is obtained. This is also attributable to the fact that the upper stage operates as an emitter-follower, the collector current of T26 varying proportionally to the load current at the output terminal 2.

The input terminals A1 and B1 of the two current mirrors are normally connected to the output terminals A2 and B2 of the rest of the circuit, but these terminals also accept external control signals for controlling the switching paths 3 and 5.

The control section of the circuit shown in FIG. 7 comprises a Hall element H which is energized by a constant voltage, and an emitter follower T33, which element is followed by a differential amplifier T31, T32, having an output C that is externally accessible, a multistage reference voltage source, and two trigger stages.

The reference voltage source comprises the emitter diodes of the transistors T9, T10, T11, T12 and T13, which are energized by a reference current obtained by means of the resistor R via a current mirror T5, T24 and T25. Via the terminal I the reference current can be varied. The reference voltage source supplies the control voltage for the Hall element H. As a result the control current of the Hall element is independent of supply voltage variations. As soon as said requirements for turning on one of the two switching paths are met, the Hall voltage overdrives the following differential amplifier T31, T32. The amplifier output current is coupled out asymmetrically via the current mirror T29, T30, T35 which in turn supplies the base currents for the transistors T14 and T17 of the respective differential amplifiers T14, T15 or T16, T17, which operate as trigger circuits and which respond at different voltage levels because the base voltages of T15 and T16 receive reference voltages which differ by three diode-voltage drops (T11, T12, T13). The transistor T15 supplies a collector current only if the base potential of the transistor T14 becomes smaller than the reference potential across transistor T15. Similarly, transistor T17 supplies a collector current only if the base potential of the transistor T17 becomes higher than the reference potential across transistor T16. This step ensures that the two switching paths cannot be turned on simultaneously.

The Zener diode T6 ensures that in the case of an excessive supply voltage the maximum permissible base-emitter reverse voltage of the transistors T15 and T16 is not exceeded when the transistors T14 or T17 conduct. In order to obtain the required currents the emitter current sources of the differential amplifiers are constituted by the transistors T34, T8 and T7 which have different emitter areas and are arranged as output stages of a combined current mirror (with T9 and T10).

The transistors T18 and T3, constituting the switching paths 3 and 5, comprise a plurality (8 or 9) of parallel-connected transistors.

The output current of the circuit can be 1 A for switching operation or 400 mA for continuous operation. The rated operating voltage is 9 V. The permissible operating voltage lies between 4.5 and approximately 15 V.

What is claimed is:

1. A DC motor comprising a permanent-magnet rotor and an electronic commutation circuit including a plurality of magnetically controllable switches in the form of an integrated semiconductor circuit and controlled by the magnetic field of the rotor, a stator comprising m phase windings, each magnetically controllable switch including first and second input terminals, an output terminal and first and second switching paths between the first and second input terminals, respectively, and the output terminal, means connecting one end of each phase winding to the output terminal of a magnetically controllable switch, and a power supply source connected between the first and the second input terminals of each switch, said first and second switching paths being controllable so that, when a switch is exposed to a magnetic field B, its first switching path is closed if $B > B_0 + [(\Delta B)/2]$, its second switching path is closed if $B < [(\Delta B)/2]$, and its two switching paths are open if $|B - B_0| < [(\Delta B)/2] \times \epsilon$, where $0 < \epsilon < 1$ and $\Delta B \geq 0$, the individual switches being symmetrically arranged about the stator of the motor so that they are controlled by the rotor magnetic field in a cyclic sequence.

2. A motor as claimed in claim 1, further comprising individual flywheel diodes connected in parallel with each switching path of each switch.

3. A motor as claimed in claim 1 wherein the rotor is axially magnetized and the switches are arranged about the peripehery of the rotor and confronting one or both rotor ends.

4. A motor as claimed in claim 1 wherein the switches are arranged on one common printed circuit board.

5. A motor as claimed in claim 4 wherein the switches are accommodated in recesses in the printed circuit board.

6. A motor as claimed in claim 4 wherein the printed circuit board and the coil formers of the stator windings form a unit.

7. A motor as claimed in claim 1 wherein the switches are mounted on a contact foil and are arranged in a transverse air gap formed between the stator and rotor.

8. A motor as claimed in claim 1 wherein the rotor is diametrically or radially magnetized and the switches are exposed to the main field or to the axial and stray field of the rotor.

9. A motor as claimed in claim 1 wherein the stator includes stator lamination assemblies and the stator lamination assemblies and the switches are arranged so that the influence of the stator field on the switches is negligible.

10. A motor as claimed in claims 1, 2, 3, 4 or 5 wherein the m phase windings of the stator are connected in m-cornered mesh configuration.

11. A motor as claimed in claims 1, 2, 3, 4 or 5 wherein the m phase windings of the stator are connected in a star configuration.

* * * * *